United States Patent
Reeb et al.

(10) Patent No.: US 12,530,594 B2
(45) Date of Patent: Jan. 20, 2026

(54) GENERATION OF SIMPLIFIED COMPUTER-IMPLEMENTED NEURAL NETWORKS

(71) Applicant: Robert Bosch GmbH, Stuttgart (DE)

(72) Inventors: David Reeb, Renningen (DE); Manuel Nonnenmacher, Holzgerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 1135 days.

(21) Appl. No.: 17/450,773

(22) Filed: Oct. 13, 2021

(65) Prior Publication Data
US 2022/0121960 A1 Apr. 21, 2022

(30) Foreign Application Priority Data

Oct. 20, 2020 (DE) .......................... 102020213238.0

(51) Int. Cl.
*G06N 3/10* (2006.01)
*G06N 3/045* (2023.01)
*G06N 3/082* (2023.01)

(52) U.S. Cl.
CPC .............. *G06N 3/10* (2013.01); *G06N 3/045* (2023.01); *G06N 3/082* (2013.01)

(58) Field of Classification Search
CPC .......... G06N 3/10; G06N 3/045; G06N 3/082; G06N 3/04; G06N 3/02
See application file for complete search history.

(56) References Cited

U.S. PATENT DOCUMENTS

| | | | |
|---|---|---|---|
| 8,879,813 B1* | 11/2014 | Solanki | G06T 7/0016 |
| | | | 382/128 |
| 11,847,567 B1* | 12/2023 | Sather | G06N 3/0499 |
| 2018/0107925 A1* | 4/2018 | Choi | G06F 17/16 |
| 2018/0114114 A1* | 4/2018 | Molchanov | G06N 3/045 |
| 2021/0042624 A1* | 2/2021 | Matveev | G06F 9/5027 |

OTHER PUBLICATIONS

"Pruning Convolutional Neural Networks for Resource Efficient Inference" Molchanov et al., ICLR 2017 (Jun. 8, 2017) (Year: 2017).*

(Continued)

*Primary Examiner* — Hope C Sheffield
(74) *Attorney, Agent, or Firm* — Norton Rose Fulbright US LLP

(57) ABSTRACT

Methods for generating a simplified computer-implemented neural network for a device. The method includes receiving a predefined neural network, which includes a plurality of neural network substructures in two or more layers; computing an approximative neural network for the predefined neural network, and computing a matrix with respect to the approximative neural network, which describes changes in the loss function due to simultaneous pruning of at least two network substructures from the plurality of neural network substructures which are situated within different layers of the two or more layers of the predefined neural network. The method finally includes pruning, based on the changes in the loss function described in the matrix, at least one neural network substructure from the plurality of neural network substructures to generate the simplified neural network.

18 Claims, 6 Drawing Sheets

(56) References Cited

OTHER PUBLICATIONS

Hassibi, et al.: "Optimal Brain Surgeon and General Network Pruning", IEEE international Conference on Neural Networks. IEEE, (1993), pp. 293-299.
Hayou, et al.: "Pruning untrained neural networks: Principles and Analysis", arXiv e-prints, 2020, S. arXiv:2002.08797v3, pp. 1-31.
Le Cun, et al.: "Optimal Brain Damage", Advances in Neural Information Processing Systems, (1990), pp. 598-605.

* cited by examiner

GENERATION OF SIMPLIFIED COMPUTER-IMPLEMENTED NEURAL NETWORKS

CROSS REFERENCE

The present application claims the benefit under 35 U.S.C. § 119 of German Patent Application No. DE 102020213238.0 filed on Oct. 20, 2020, which is expressly incorporated herein by reference in its entirety.

FIELD

The present invention relates to techniques for generating a simplified computer-implemented neural network from a predefined neural network and to techniques for using a simplified computer-implemented neural network.

BACKGROUND INFORMATION

Computer-implemented neural networks are increasingly used in various technical devices. The neural networks may include complex structures (e.g., having a large number of neurons, layers and corresponding connections) for many technical devices. This may present (excessively) high requirements with regard to the hardware necessary for using the neural networks. For this reason, it may be necessary to find a compromise between the performance capability of the computer-implemented neural network and its complexity.

To address the above-described problem, so-called pruning methods were developed. These are aimed, on the one hand, at reducing the size of the neural networks and their overall structure, while, on the other hand, maintaining (or impairing as little as possible) a favorable overall performance of the simplified neural networks. The neural networks simplified based on these methods may thus be used, e.g., for smaller technical devices having limited hardware resources (such as for example electrical tools, gardening equipment or household appliances, etc.). In other examples, it may be necessary to reduce the assessment time of a computer-implemented neural network to ensure a sufficiently rapid response of a technical device (e.g., of an autonomous robot). It may also be advantageous for this purpose to simplify a computer-implemented neural network.

SUMMARY

The present invention relates to a method for generating a simplified computer-implemented neural network for a device. In accordance with an example embodiment of the present invention, the method includes receiving a predefined neural network, which includes a plurality of neural network substructures in two or more layers. The method furthermore includes computing an approximative neural network for the predefined neural network, and computing a matrix with respect to the approximative neural network, which describes changes in a loss function due to the pruning of one or multiple neural network substructure(s) from the plurality of neural network substructures. The matrix takes into consideration the changes in the loss function due to simultaneous pruning of at least two network substructures from the plurality of neural network substructures, which are situated within different layers of the two or more layers of the predefined neural network. The method finally includes pruning, based on the changes in the loss function described in the matrix, at least one neural network substructure from the plurality of neural network substructures to generate the simplified neural network.

The present invention furthermore includes the use of the simplified computer-implemented neural network in the technical device, as well as computer-implemented neural networks which are generated using corresponding methods.

The techniques of the present invention are aimed at generating a simplified neural network of a smaller size (e.g., having a lower number of neurons and/or connections and/or layers) compared to the original predefined neural network. In the process, a loss of overall performance or accuracy of the generated simplified neural network should not be too great (and, ideally, no loss of overall performance or accuracy is to occur). Such simplified (pruned) computer-implemented neural networks may be suitable for technical devices including relatively manageable hardware resources (e.g., portable electrical devices or devices without a permanent network connection) or in technical surroundings in which a higher computing and assessment speed is of benefit (e.g., in the case of at least semi-autonomous vehicles). However, the reduced complexity and/or increased computing and assessment speed may also be beneficial for other technical surroundings (e.g., for reducing a power consumption).

DETAILED DESCRIPTION OF EXAMPLE EMBODIMENTS

The present invention relates to a method for generating a simplified computer-implemented neural network from a predefined neural network by pruning its structure.

Figure 1A:
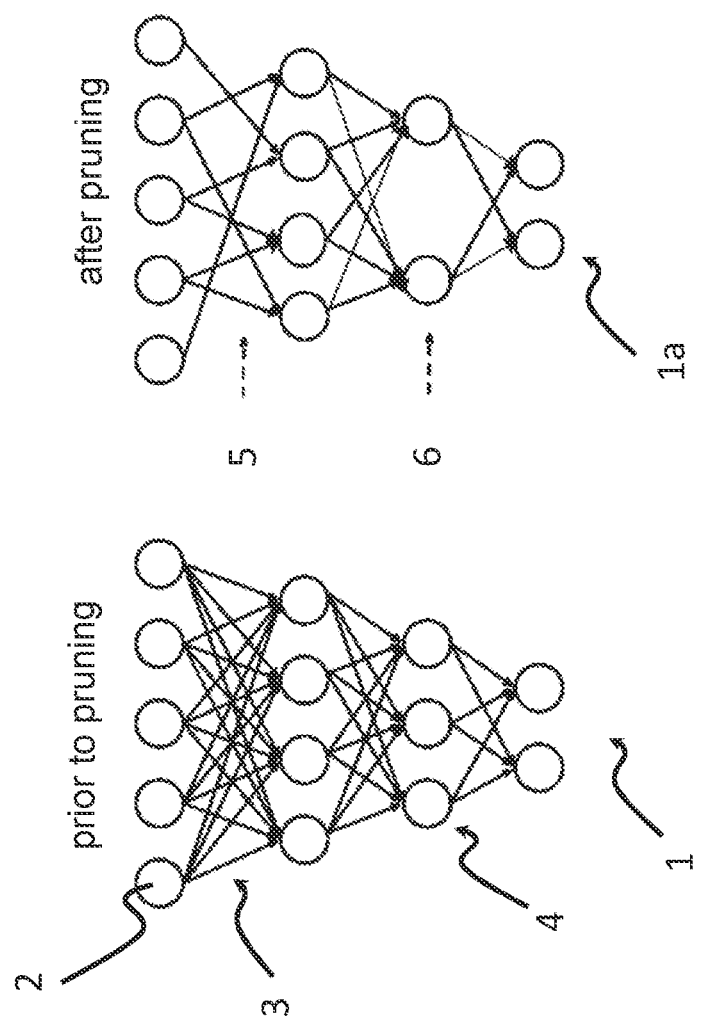
FIG. 1A schematically shows an original trained neural network prior to and after pruning (simplifying). The neurons and their connections are represented as nodes (circles) or edges (arrows).

An exemplary neural network 1 is (schematically) outlined in FIG. 1A. The neural network may be made up of a plurality of neurons (an exemplary neuron 2 is highlighted in FIG. 1A), which form nodes of neural network 1 and are connected to one another by edges 3. The neurons of the computer-implemented neural networks of the present invention are situated in multiple layers (e.g., third layer 4 of FIG. 1A includes three neurons). In the present invention, the edges or connections leading to the neurons (or nodes) are considered to be part of the respective layer (i.e., the input connections and the nodes are situated in the same layer). A computer-implemented neural network may include two or more, three or more, or five or more layers. The neurons and their connections may include different structures and be represented as nodes or edges with the aid of a graph. In the present invention, an arbitrary subset of elements of the neural network is referred to as a "neural network substructure." In some examples, a neural network substructure may include one or multiple edge(s), one or multiple node(s), or a combination of one or multiple node(s) and edge(s) (for example, one node and the edges leading to the node and away from the node). Networks other than those shown in FIG. 1A may include additional elements (e.g., feedbacks or memories). These elements may also be a neural network substructure or part thereof. In other examples, an element of the neural network may be a parameter for describing the neural network (this aspect is described in greater detail below).

The output of a certain neuron j may depend on applied inputs of one or multiple neuron(s) i. In particular, first a sum of the weighted applied inputs for neuron j may be formed, it being possible to define a weight of the form $\theta_{ij}$ from neuron j to neuron i for all neurons. ($\theta_{ij}=0$ may mean that neuron j does not have any connection to neuron i.) Finally, the output of neuron j may be ascertained after applying an activation function defined for the particular neuron to the previously computed sum. A neural network may thus be defined in some examples by indicating its topology and/or weights $\theta_{ij}$ for all neurons. The weights may thus also be elements of a neural network substructure within the meaning of the present invention. This means that a neural network substructure may include one or multiple weight(s) of the neural network (which may correspond to one or multiple edge(s) of the graphical description of the neural network). According to the language introduced above, all weights of connections or edges which lead to nodes or neurons of a particular layer belong to this one layer. The weights of the output edges or connections of this particular layer belong to another layer.

The computer-implemented neural network may be created and trained (e.g., trained completely or incompletely) for use in a certain device to process data arising in this device (e.g., sensor data) and, for example, to compute output data relevant for supervising and/or controlling the device. In this way, the properties of this device or its response to certain events may ultimately be "hidden" in the topology and weights $\theta_{ij}$ of the neural network. In other examples, a neural network may also be described by parameters other than and/or in addition to weights $\theta_{ij}$. In the present invention, weights $\theta_{ij}$ are discussed as exemplary parameters. The techniques described herein, however, may basically be used for other parameters.

Several methods used in the related art for pruning network structures from trained neural networks take place as follows: After a neural network has been generated, whose topology depends on its task, weights $\theta_{ij}$ may be accordingly selected. The selection of these weights is referred to as training or teaching the neural network. This step is executed on a computer system. During "supervised learning," a plurality of input data sets $x_k$ (e.g., sensor data) and a corresponding plurality of desired output data sets $y_k$ (e.g., a state of a technical device or of its surroundings or a control parameter) is available (i.e., the input and output data sets in each case form a pair). The data set, which in each case is made up of N pairs $(x_k, y_k)$, $k=1, \ldots, N$, is referred to as a training data set. The training of the neural network may be formulated as an optimization problem in which weights $\theta_{ij}$ of the neural network have to be adapted in such a way that output $f_\theta^{NN}(x_k)$ generated by the neural network for the given input $x_k$ ($f_\theta^{NN}$ being a transfer function of the neural network for a parameter set $\theta$, e.g., a set of weights) is as close as possible to the desired output $y_k$. This optimization problem may be represented as a minimization of a loss function $L_D$ (in the present invention, this is referred to as a minimization of the loss function even though, in some instances, this corresponds to a maximization of an expression). The loss function may take on various forms. In one example, the loss function is a function of the mean squared error (MSE), for example:

$$\min(L_D) = \min \frac{1}{2N} \sum_{k=1}^{N} (f_\theta^{NN}(x_k) - y_k)^2.$$

The minimization may be carried out with respect to all weights $\theta_{ij}$. As a result of this minimization, trained weights $\theta_{ij}^{Tr}$ are determined, which result in a local (or global) minimum of loss function $L_D$. In this way, a trained neural network is established. The goal of this training is not only to reproduce the desired outputs ($f_\theta^{NN}(x_k) \approx y_k$) in the training phase, but also to be able to supply plausible outputs (i.e., unknown outputs) for further inputs $x_k$.

The trained neural network may include a complex topology and a large number of neurons and connections, and may thus cause high and undesirable hardware requirements during the computation. As was already mentioned above, this complex neural network is initially simplified with the aid of the pruning methods, so that it may be used on the corresponding device. The right side of FIG. 1A shows a simplified (pruned) neural network 1A. For example, multiple edges (connections) have been pruned between the uppermost layer and underlying layer 5. In addition, a node, including associated edges, has been pruned in penultimate layer 6.

This simplification may encompass an analysis of the respective changes in loss function $L_D$ as a result of the pruning of one or multiple neural network substructure(s). The pruning of a structure may encompass the removal of one or multiple connection(s) (i.e., edge(s)) between neurons and/or the complete removal of one or multiple neuron(s) together with its or their incoming and outgoing connections. In other cases (or in another image), the pruning may encompass the removal or setting to zero of one or multiple weight(s) (which may be an alternative description for the removal of one or multiple connection(s) or edge(s)). In other cases, neural networks may encompass elements which go beyond the structures shown in FIG. 1A (e.g., feedbacks or memories). These network substructures may also be pruned using the methods of the present invention.

In the process, in some examples, changes in the loss function may be approximated up to a certain order due to the pruning of structures by a Taylor development of loss function $L_D$ with respect to weights $\theta_{ij}$. For example, a development of the following form may exist:

$$\delta L_D(\theta) \approx \frac{\partial L_D(\theta)}{\partial \theta}\delta\theta + \frac{1}{2}\delta\theta^T H(\theta)\delta\theta + \ldots \ .$$

Figure 1B:
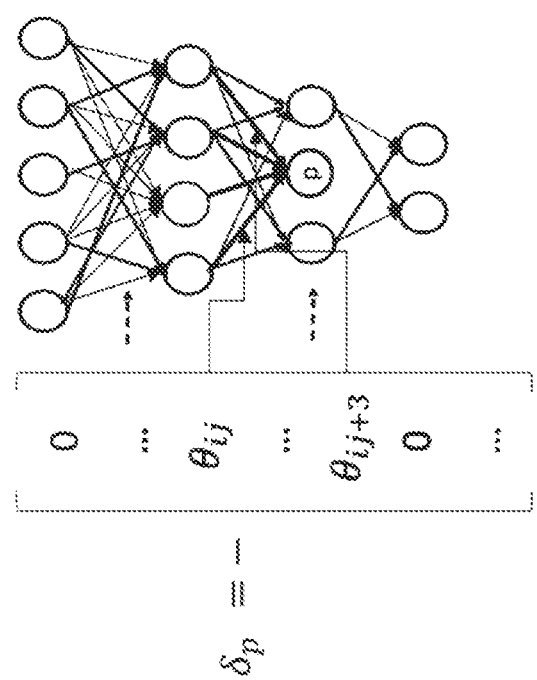
FIG. 1B schematically shows a pruning vector $\delta_p$, with the aid of which Hessian matrix H may be converted to the Q matrix (matrix which describes changes in a loss function due to the pruning of one or multiple neural network substructure(s) from the plurality of neural network substructures). Pruning vector $\delta_p$ here refers to node p of the neural network and describes a change in the present weights due to the pruning of one or multiple connection(s) of node p.

Here, $\delta\theta$ is a disturbance vector around a given weights vector $\theta$ of a predefined neural network (e.g., a trained neural network including weights $\theta_{ij}^{Tr}$), which reflects corresponding changes in weights, $\theta_{ij}^{Tr}+\delta\theta_{ij}$, after pruning. $\delta\theta^T$ results from the transposition of $\delta\theta$. $H(\theta)=\partial^2 L_D/\partial^2\theta$ is the Hessian matrix, which is made up of partial derivatives of the second order of loss function $L_D(\theta)$ with respect to weights $\theta_{ij}$, which in this example are computed for trained weights $\theta_{ij}^{Tr}$. In the process, $\partial L_D M/\partial\theta=0$ applies (at least approximately) for the trained network since $\delta L_D(\theta)$ has a minimum for trained weights $\theta_{ij}^{Tr}$ (at least approximately within the scope of a predetermined numerical accuracy). The terms of an order higher than the second order in the Taylor development may be neglected. The changes in the loss function are then given by $\delta L_D(\theta)\approx\frac{1}{2}\delta_p^T H(\theta)\delta_p$. As illustrated in FIG. 1B, $\delta_p^T$ corresponds to a pruning vector of weights $\theta_{ij}^{Tr}$ for the corresponding substructure (e.g., for node p). In this case, the pruning vector describes a change in the present weights due to the pruning of one or multiple connections of node p. Pruning vectors may also be defined for other network substructures (e.g., for a combination of two or more nodes including corresponding incoming edges, the nodes being situated within different layers or within one layer or the nodes being adjoining nodes).

The formula for the Taylor development of loss function $L_D$ is only shown as an example and, depending on the selected standardizations for the particular vectors, may also take on another expression (e.g., the factor in the second term of the Taylor development shown above may be included in $\delta\theta$ and $\delta\theta^T$).

For the case when multiple neural network substructures are pruned, the changes in the loss function may be represented as a sum across a plurality of components of the matrix, which describes changes in a loss function due to the pruning of one or multiple neural network substructure(s) from the plurality of neural network substructures. For example, the changes in the loss function may be determined in the following form: $\delta L_D(\theta)\approx\frac{1}{2}\Sigma_{prun.\ pq} Q_{pq}$ matrix $Q_{pq}$ being defined as $Q_{pq}=\delta_p^T H(\theta)\delta_q$. Continuous indices p and q in the sum run from 1 to S, S denoting the total number of network substructures. Hessian matrix $H(\theta)$ is made up of partial derivatives of the second order $\partial^2 L_D/\partial^2(\delta\theta_{ij})$, and this matrix therefore, in general, has the non-diagonal components (i.e., the cross terms), which cannot be negligibly small. This may be explained by the fact that loss function $L_D$ may be a non-linear function with respect to weights $\theta_{ij}$. Matrix $Q_{pq}$, which is defined by Hessian matrix $H(\theta)$, may consequently also have a non-diagonal form. In summary, the changes in the loss function, in some examples, may be represented as the sum of two terms: $\delta L_D(\theta)\approx\frac{1}{2}\Sigma_{prun.\ p} Q_{pp}+\frac{1}{2}\Sigma_{prun.\ p\neq q} Q_{pq}$. The first term is the sum of the diagonal components of matrix $Q_{pq}$ with p=q, which takes the changes in the loss function due to the pruning of each substructure p individually into consideration. Each diagonal component $Q_{pp}$ is only given by the corresponding pruned substructure p. The second term now represents the sum of all non-diagonal components of matrix $Q_{pq}$ with p≠q. In this way, each non-diagonal component $Q_{pq}$ may describe a change in the loss function due to the simultaneous pruning of both substructure p and substructure q. Within this meaning, it is possible to speak of a correlation between the two substructures p and q since such a change in the loss function only occurs when the two substructures are pruned simultaneously.

Despite the seemingly simple expression for the changes in the loss function, some difficulties may exist during the computation of $\delta L_D(\theta)$. First, dimension P×P of Hessian matrix $H(\theta)$ (and consequently of matrix $Q_{pq}$) is normally very large, P denoting the total number of connections in a neural network. For this reason, the Hessian matrix is approximated by a diagonal matrix (or nearly a diagonal matrix) in some methods of the related art available thus far. However, this approximation neglects possible correlations between the network structures within the above-defined meaning. This, however, may result in (partially considerable) inaccuracies during the estimation, which the network substructures influence the performance capability of the neural network. Secondly, the computation of $\delta L_D(\theta)$ includes a large number of calculation steps on a computer-implemented system, which scales with the number of training data sets N and dimension P of pruning vector $\delta_p$, according to 0 (N·P²). Moreover, the number of calculation steps becomes completely independent of the fact that the particular dimension S for a network substructure, whose pruning is being considered, may be considerably smaller than the total number of connections in a neural network P. Consequently, the aforementioned estimation may be computationally difficult to carry out for complex structures with large P. Third, additionally the problem may arise that the training of neural networks (in particular such that are relatively large and complex) may be a very complex, and thus protracted, task from a computational perspective. The techniques of the present invention may address these problems in some implementations.

The first step of the method for generating a simplified computer-implemented neural network of the present invention may, for example, encompass receiving a predefined neural network, which includes a plurality of neural network substructures in two or more layers. Each layer may, for example, be given by a plurality of neurons and corresponding incoming connections. In the process, a weighted output of a neuron which is situated in a layer may be an input of another neuron which may be situated in another layer. For example, neural network 1 according to FIG. 1A includes four layers. Present weights $\theta_{ij}^{Ak}$ may be given for the predefined neural network. In some instances, it is also possible to receive a training data set $(x_k, y_k)$ which is used for training the neural network or to be used for training. In some cases, the predefined neural network may be a trained neural network (e.g., a loss function was minimized by training). In other examples, the predefined neural network may be an incompletely trained neural network (e.g., a loss function was not yet minimized by training). In some instances, an incompletely trained neural network may only have run through a fraction of the training passes needed for complete training (so-called epochs, which may represent a complete training iteration across the training data set, e.g., by carrying out a stochastic gradient descent or another method) (e.g., fewer than 100 training passes or fewer than 20 training passes). The pruning methods of the present invention may, in particular, be advantageous for not completely trained neural networks. A training effort may be reduced as a result of the "early" pruning.

Training data set $(x_k, y_k)$ may include data of different types, input data (xk) and output data (yk) being combined in each pair to form a pair (k=1 . . . N). For example, an input datum and an output datum in each case may be a scalar (e.g., a scalar measuring value), a vector of any arbitrary length (i.e., having a length of one or greater) or a matrix. The input data may represent environmental influences or internal operating states of a technical device. In one example, the input data may encompass sensor data. As an alternative or in addition, the input data may encompass image data and/or audio data. The output data may be a state or a recognized event of the device or of the surroundings (e.g., the state "battery almost empty" or "it is raining" for an electrical device). In other examples, the output variable may be a control parameter (e.g., for an actuator) or identify a response of the device in another manner.

According to the present invention, initially an approximative neural network is computed for the predefined neural network. This may encompass an approximation around present weights $\theta_{ij}^{Ak}$ of the predefined neural network. The approximative neural network may, for example, be generated by a linearization around present weights $\theta_{ij}^{Ak}$. For example, the neural network may be approximated by a sum of an evaluation of a transfer function of the neural network in the case of a set of weights, plus a term which scales linearly with the weights. This may be described as follows, for example: $f_\theta^{NN}(x) \approx f_{\theta_k}^{Lin}(x) = \theta_{\theta_k}^{NN}(x) + \phi(x)(\theta - \theta_k)$, $\phi(x) = \nabla_\theta f_\theta^{NN}(x)|_{\theta=\theta_k}$ being the gradients of the transfer function of the neural network which are calculated in the case of present weights $\theta_{ij}^{Ak}$ on a training data set. As a result of this measure, further steps of the method may be carried out in a more resource-efficient manner (e.g., using fewer calculation steps on a computer system).

In another step of the method according to the present invention, matrix $Q_{pq}$ may be computed with respect to the approximative neural network which was previously generated, the matrix describing changes in loss function $\delta L_D(\theta)$. As explained above, these changes may be caused by the pruning of one or multiple neural network substructures from the plurality of neural network substructures. Matrix $Q_{pq}$ may describe the changes in the loss function due to simultaneous pruning of at least two network substructures from the plurality of neural network substructures (i.e., matrix $Q_{pq}$ may take the respective correlations between at least two network substructures into consideration), which are situated within different layers of the predefined neural network. In some examples, matrix $Q_{pq}$ may additionally take the changes in the loss function due to simultaneous pruning of network substructures into consideration, which are situated within a layer of the predefined neural network. In some examples, the matrix may describe changes in the loss function due to the simultaneous pruning of multiple pairs of the at least two network substructures from the plurality of neural network substructures (for example, all possible pairs).

Based on a change in the loss function described in matrix $Q_{pq}$, e.g., based on a plurality of (for example all) computed components of this matrix (and not only based on the primary diagonal components, as in some methods of the related art), it is possible to determine which neural network substructures make a minor or even negligible contribution to the overall performance of the original predefined neural network (e.g., the overall performance does not decrease by more than a predetermined measure). In this connection, for example, only those substructures which, after pruning, do not cause any increase in loss function $\delta L_D(\theta)$, or only an increase that does not exceed the measure, may be classified as the substructures to be pruned. The substructures thus classified may thus be pruned from the predefined neural network to enable the generation of a simplified neural network for the device. The resulting simplified neural network may supply data for a device more quickly and/or require fewer hardware resources.

In the process, the above-described linearization may correspond to the approximation in the loss function when the changes in $\delta L_D(\theta)$ resulting from pruning, using a Taylor series of the second order of the predefined neural network, are approximated by its present weights $\theta_{ij}^{Ak}$. In some instances, the first derivatives of the loss function with respect to their weights, $\partial L_D(\theta)/\partial \theta$, will not disappear when the predefined neural network is not a trained neural network (but an only partially trained neural network).

Furthermore, for example, the method may encompass computing the above-described gradients $\phi(X)$ of the predefined neural network around the present weights. In one example, the computation of gradients $\phi(X)$ may use a present matrix X which may include the input data of the N pairs of the input data set. Thereafter, gradients $\phi(X)$ may be multiplied with a pruning vector (also referred to as disturbance vector) $\delta_q$ of the network substructure to obtain a second vector $\phi_q = \phi(X)\delta_q$ of dimension N, each pruning vector $(\delta_p)$ being assigned to a network substructure to be pruned. In this way, a plurality of second vectors $\phi_q$ (namely S second vectors) may be derived to take possible structural changes in the predefined neural network into consideration. The computation costs will scale for these steps as $O(N \cdot P)$. In other examples, the computation of gradients $\phi(X)$ and second vector $\phi_q$ may be implemented using the Jacobian vector product. This, in turn, may be more efficient computationally than some methods of the related art.

As mentioned, the predefined neural network may be a trained neural network in one example. In this case, a training data set (X) may be made up of a plurality of pairs $(X = \{(x_i, y_i) | i \leq n\})$, each pair being formed of input data sets and respective output data sets of the technical device, and the predefined neural network being able to generate the respective output sets for the input sets of each pair. In addition, a vector of the first derivatives of the loss function with respect to its weights, which is calculated after a use of trained weights $\theta_{ij}^{Tr}$, may take on a value $(\partial L_D(\delta\theta)/\partial\theta=0)$ which corresponds to a local (or global) minimum of the loss function (within the scope of a predetermined accuracy). In this example, the computation of all components of matrix $Q_{pq}$ may be carried out by computing the scalar product of the obtained second vectors $\phi_p$ and $\phi_q$ from the plurality of second vectors for a plurality of pairs (e.g., for each pair) of neural network substructures of the trained neural network $(Q_{pq} = \frac{1}{2}\delta_q^T \phi(X)^T \phi(X)\delta_q)$.

In other examples, the predefined neural network may be an incompletely trained neural network (it being possible to understand the term "incompletely trained" within the meaning introduced above) in that a vector of the first derivatives of the loss function with respect to their weights, which is calculated after a use of present weights $\theta_{ij}^{Ak}$, is able to take on a value (e.g., a value deviating considerably from zero with $\partial L_D(\theta)/\partial\theta \neq 0$), which does not correspond to a local minimum of the loss function for the present weights. In this case, the loss function will not have a local minimum for the present weights.

In one example, the usual training of a neural network may be terminated after a few optimization steps (epochs), and the resulting neural network may be used as the predefined neural network for the method of the present invention. In another example, a neural network may be initialized by certain weight values. The initialized neural network may then be immediately implemented in the method according to the present invention and be considered as the predefined neural network. The use of the incompletely trained neural network may, in particular, be well-suited when the usual training of a neural network is computationally complex or not even possible due to limited hardware resources.

The computation of matrix $Q_{pq}$, using the incompletely trained neural network, may encompass three steps. Initially, as in the first example of the trained neural network, the scalar products of the obtained second vectors $\phi_p$ and $\phi_q$ may be computed from the plurality of second vectors for a plurality of pairs (e.g., for each pair) of neural network substructures of the incompletely trained neural network. In this way, a (first) contribution both for the primary diagonal components and for the secondary diagonal components may be computed. Furthermore, a second contribution to the primary diagonal components of matrix $Q_{pq}$ is taken into consideration, which is carried out by computing the scalar product of a vector of the first derivatives of the loss function with respect to the plurality of pruning vectors $\delta_p$, in which subsequently the present weights are used, and the plurality of first vectors $\delta_p$. Finally, the two contributions are added. This may take place, for example, in the following form $$Q_{pq} = \frac{1}{2}\delta_q^T \phi(X)^T \phi(X) \delta_q + \delta_{pq} \frac{\partial L_D(\theta)}{\partial \delta_p} \delta_p,$$

$\delta_{pq}$ being the Kronecker delta.

Regardless of whether a trained or an incompletely trained neural network is used in the methods as the predefined neural network, the computation costs of matrix $Q_{pq}$ may scale in some cases with $O(N \cdot S^2)$. In summary, the overall computation costs of the method according to the present invention may scale with $O(N \cdot S^2) + O(N \cdot P)$ to compute all components of matrix $Q_{pq}$. In this way, the method of the present invention may have a gain of computation costs, especially in the case of larger structures with $S \ll P$ since the direct computation of matrix $Q_{pq}$ may require considerably more calculation steps $O(N \cdot P^2)$.

In the next step of the method and in agreement with the above discussions, the information in matrix $Q_{pq}$ is used to estimate which substructures may be pruned.

In the process, in a first method first all components in each column of matrix $Q_{pq}$ may be added to obtain a plurality of sums. Thereafter, a plurality of neural network substructures are iteratively removed, taking the calculated sums into consideration. This may be carried out, for example, proceeding from a neural network substructure for which a smallest amount of a sum of the plurality of sums is computed. These neural network substructures may be the first to be removed. The result of this so-called "lin sum OBD" (optimal brain damage) pruning method is shown by way of example for a neural network in FIG. 2A, which was created for the Boston Housing data set (i.e., a standard data set). Four exemplary columns 7a through d are shown on this figure, the amount of the sum being illustrated by a density of the dotting. Right column 7d has the smallest sum. The associated neural network substructure may thus be the first to be pruned.

Figure 2A:
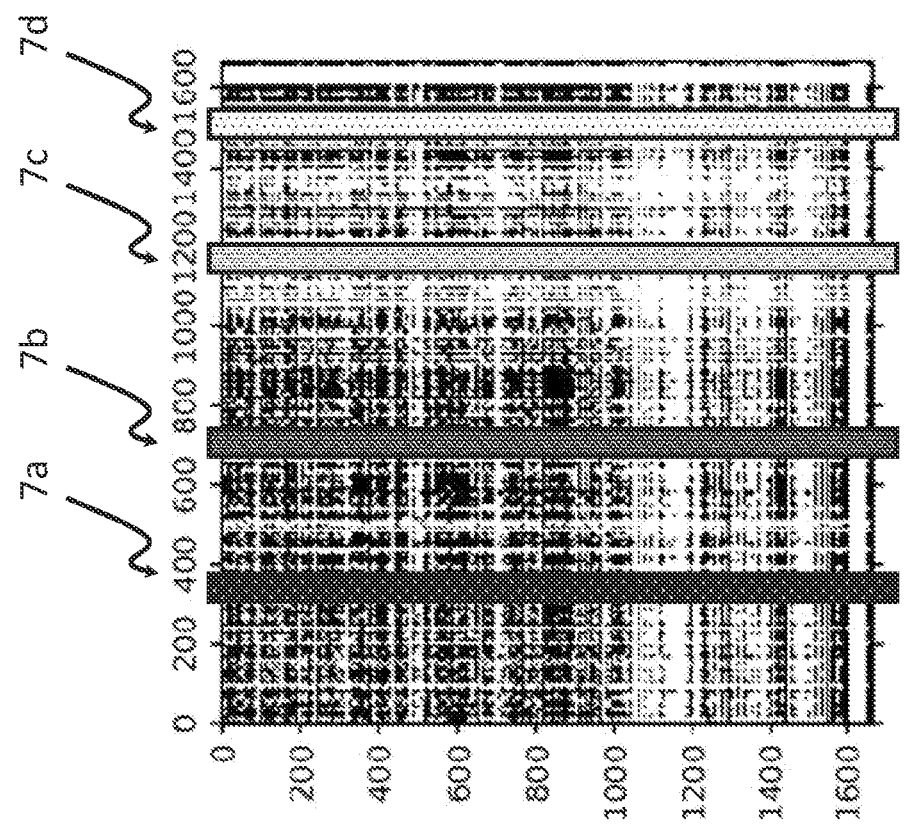
FIG. 2A schematically shows all computed components of the Q matrix (black elements correspond to larger values) and the pruning, using the "Lin Sum OBD" pruning method, for a neural network which was created for the Boston Housing data set (i.e., a standard data set). The neural structures which correspond to the components of the Q matrix marked by the lines are iteratively removed.
Figure 2B:
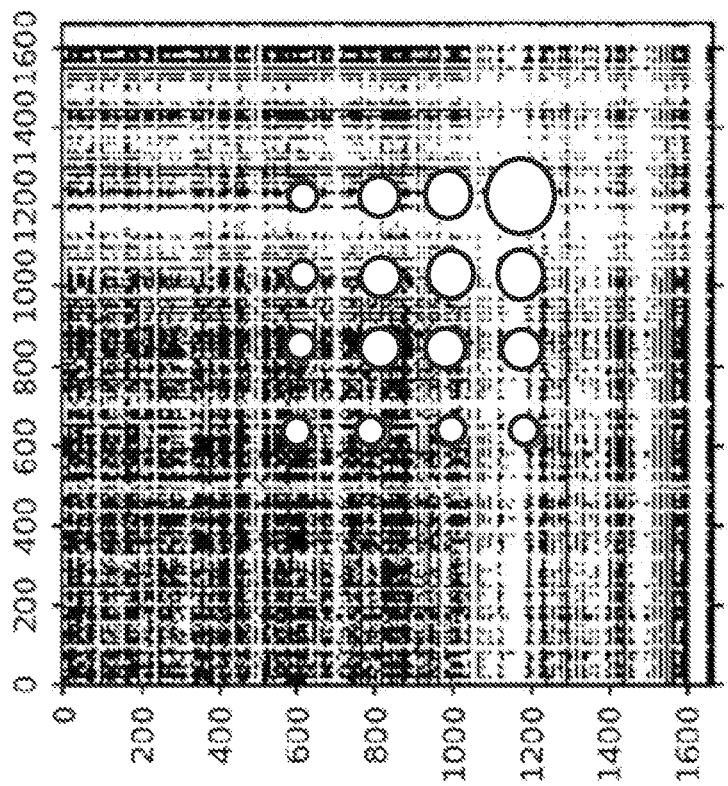
FIG. 2B, similarly to FIG. 2A, schematically shows the same components of the Q matrix and the pruning, using the "iterative full OBD" pruning method. The neural structures, which correspond to the components of the Q matrix marked by the white circles, are iteratively removed.

In an alternative method, first a neural network substructure is removed, which corresponds to a smallest amount of a primary diagonal component of matrix $Q_{pq}$. Thereafter, a plurality of neural network substructures are iteratively removed, each subsequent neural network substructure to be removed corresponding to a smallest amount of a sum from a plurality of sums of a primary diagonal component and non-diagonal components of the matrix, which relate to previously removed neural network substructures. The example of using this "iterative full OBD" pruning method for the same neural network as in FIG. 2A is shown in FIG. 2B. Exemplary diagonal and non-diagonal components are represented by circles, the size of a circle being inversely proportional to the size of the primary diagonal component/ the sum of the primary diagonal component and non-diagonal components.

In another alternative method, a neural network substructure, which corresponds to a primary diagonal component of matrix ($Q_{pq}$) with a predefined value, optionally of a smallest primary diagonal component of matrix ($Q_{pq}$) may be removed first. In one example, initially the computed primary diagonal components of matrix $Q_{pq}$ may be situated in ascending order. Then, a neural network substructure is removed, which corresponds to the smallest primary diagonal components. Next, the method according to the present invention includes iteratively removing a plurality of neural network substructures, each subsequent neural network substructure to be removed corresponding to a next-larger value of the situated primary diagonal components. The result of this "structured OBD" (structured optimal brain damage) pruning method for the same neural network as in FIG. 2A and FIG. 2B is shown as an example in FIG. 2C. Exemplary diagonal components are represented by circles, the size of a circle being inversely proportional to the size of the primary diagonal component.

Figure 2C:
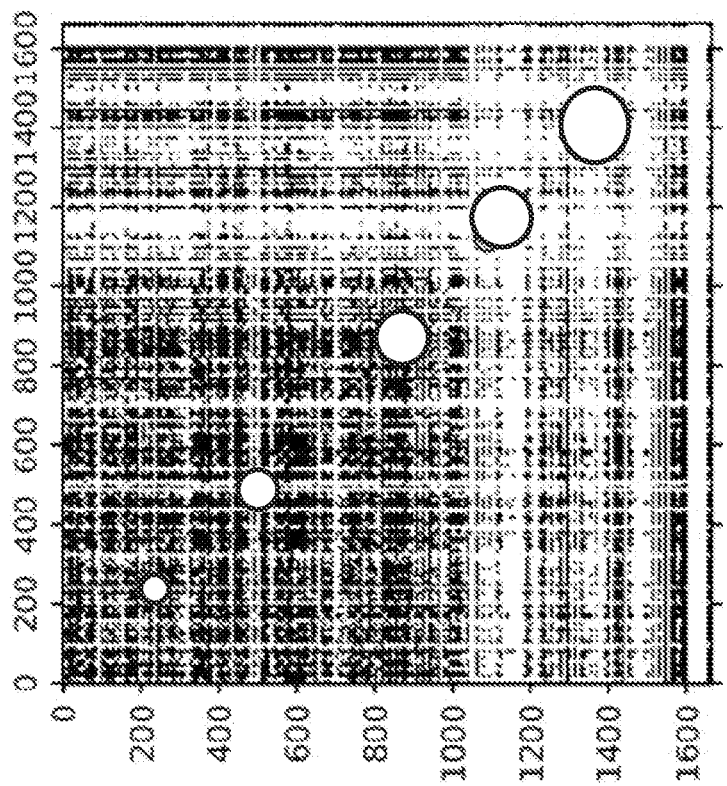
FIG. 2C, similarly to FIG. 2A and FIG. 2B, schematically shows the same components of the Q matrix and the pruning, using the "structured optimal brain damage (structured OBD)" pruning method. The neural structures, which correspond to the components of the Q matrix marked by the white circles, are iteratively removed.
Figure 3:
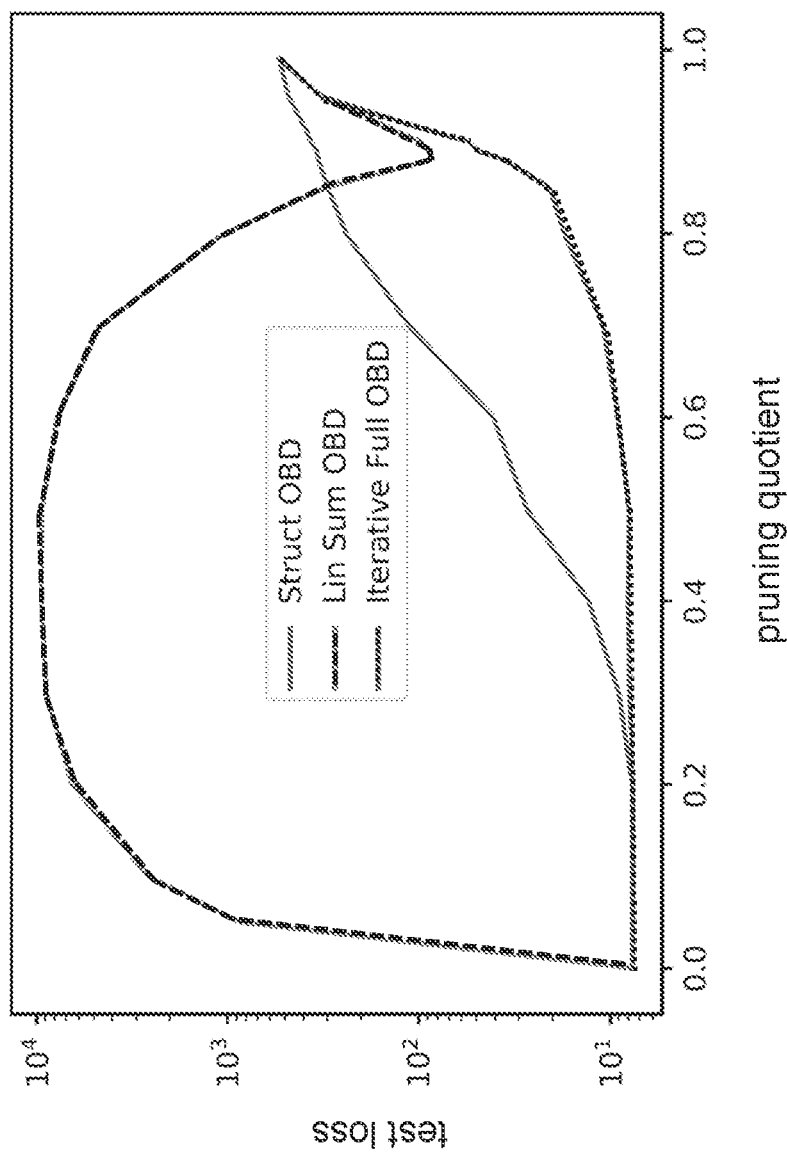
FIG. 3 compares the test losses for the pruning methods used in FIGS. 2A through 2C as a function of different values of the pruning ratio. The pruning ratio of zero corresponds to the case when the predefined neural network is not pruned. In this example, a trained neural network is selected as the predefined neural network.

In FIG. 3, the test losses for the pruning methods used in FIGS. 2A through 2C are compared as a function of different values of the pruning ratio. The pruning ratio of zero corresponds to the case when the predefined neural network is not pruned. In this example, a trained neural network is selected as the predefined neural network. The overall performance of the pruned network for the "iterative full OBD" method or for the "structured OBD" method remains practically unimpaired for the values of the pruning ratio of less than 0.7 or 0.4, as this figure illustrates.

In general, all three aforementioned pruning methods are carried out until a size of the simplified neural network drops below a desired size. In one example, the desired size may be given by a minimum number of neurons in the simplified neural network or within a layer of the simplified neural network. In other examples, the desired size may be defined by a minimum number of connections between neurons in the simplified neural network or by a minimum number of connections between neurons within a layer of the simplified neural network. The desired size may also be given, for example, as a minimum number of unpruned layers or structures of the simplified neural network. In other examples, the pruning methods are carried out until an overall performance of the simplified neural network drops below a predefined threshold value. For example, the overall performance may be estimated with the aid of test losses (see, e.g., FIG. 3) which, in turn, may be computed based on the loss function. In one example, the predefined threshold value may be defined as a ratio between the overall performance of the simplified and of the predefined neural network. In another example, the predefined threshold value may correspond to a selected number.

As previously discussed, the simplified computer-implemented neural networks of the present invention may be used in different technical applications. In general, the present invention also relates to methods, first for pruning a computer-implemented neural network, and then for using the computer-implemented neural network in a technical device. The use may, for example, encompass controlling (or regulating) the technical device by the simplified neural network, identifying an operating state (e.g., a malfunction) of the technical device or of a state of the surroundings of the technical device by the simplified neural network, or assessing an operating state of the technical device or of a state of the surroundings of the technical device by the simplified neural network. In this case, the input data may include state data with respect to an internal state of the device (e.g., at least partially sensor data). In addition or as an alternative, the input data may include state data with respect to the surroundings of the device (e.g., at least partially sensor data). The output data of the simplified neural network may characterize an operating state or other internal state of the device (e.g., whether an error or a critical operating state is present or not). The output data may be used to control the device in response to the characterized operating state or to another internal state. As an alternative or in addition, the output data may include control data for the device.

In some instances, the device may be an electrical device (e.g., a tool, a household appliance or a gardening implement). In other examples, the device may be a device in the Internet of Things. As an alternative or in addition, the device may be a battery-operated device. As described above, the simplified computer-implemented neural networks may be advantageous in these surroundings since they may be designed to be comparatively resource-efficient.

The simplified computer-implemented neural network may be used to classify a time series, in particular to classify image data (i.e., the device is an image classifier). The image data may, for example, be camera, LIDAR, radar, ultrasonic or thermal image data (e.g., generated by corresponding sensors). The image data may encompass individual images or video data. In some examples, the computer-implemented neural network may be designed for a supervision device (for example of a manufacturing process and/or for quality assurance) or for a medical imaging system (for example for interpreting diagnostic data) or be used in such a device. The image classifier may be designed to receive image data and to classify them into multiple classes. In some examples, this may encompass mapping input data in the form of an input vector of a dimension (Rn) which includes image data to output data in the form of an output vector of a second dimension (Rm) which represents a classification result. For example, components of the input vector may represent a plurality of received image data. Each component of the output vector may represent a result of an image classification, which is computed based on the simplified computer-implemented neural network. In some examples, the image classification may encompass a semantic segmentation of an image (e.g., area-by-area, pixelwise classification of the image). The image classification may, for example, be an object classification. For example, the presence of one or more object(s) in the image data may be detected (e.g., in a driver assistance system to automatically identify traffic signs or lanes).

In other examples (or in addition), the computer-implemented neural network may be designed or used to supervise the operating state and/or the surroundings of an at least semi-autonomous robot. The at least semi-autonomous robot may be an autonomous vehicle (or another at least semi-autonomous means of locomotion or transportation). In other examples, the at least semi-autonomous robot may be an industrial robot. In other examples, the device may be a machine or a group of machines (e.g., of an industrial plant). For example, an operating state of a machine tool may be supervised. In these examples, output data y may include information with respect to the operating state and/or the surroundings of the particular technical device.

In other examples, the system to be supervised may be a communication network. In some examples, the network may be a telecommunication network (e.g., a 5G network). In these examples, input data x may include output data in nodes of the network, and output data y may include information with respect to the assignment of resources (e.g., channels, bandwidth in channels of the network or other resources). In other examples, a network malfunction may be identified.

In other examples (or in addition), the computer-implemented neural network may be designed or used to control (or regulate) a technical device. The device may, in turn, be one of the devices discussed above (or below) (e.g., an at least semi-autonomous robot or a machine). In these examples, output data y may include a control parameter of the particular technical system.

In still other examples (or in addition), the computer-implemented neural network may be designed or used to filter a signal. In some instances, the signal may be an audio signal or a video signal. In these examples, the output data y may include a filtered signal.

The methods for generating and using a simplified computer-implemented neural network of the present invention may be carried out on a computer-implemented system. The computer-implemented system may include at least one processor, at least one memory (which may include programs which, when executed, carry out the methods of the present invention), as well as at least one interface for inputs and outputs. The computer-implemented system may be a stand-alone system or a distributed system which communicates via a network (e.g., the Internet).

The present invention also relates to (simplified) computer-implemented neural networks which are generated using the methods of the present invention. The present invention also relates to computer programs which are configured to execute all steps of the methods of the present invention. In addition, the present invention relates to machine-readable memory media (e.g., optical memory media or read-only memories, for example FLASH memories) on which computer programs are stored which are configured to carry out all steps of the method of the present invention.

What is claimed is:

1. A method for generating a simplified computer-implemented neural network for a device, the method comprising the following steps:

receiving a predefined neural network, which includes a plurality of neural network substructures in two or more layers;

computing an approximative neural network for the predefined neural network, wherein the computation of the approximative neural network includes a linearization around present weights of the predefined neural network;

computing a matrix with respect to the approximative neural network, which describes changes in a loss function by a pruning of one or multiple neural network substructure(s) from the plurality of neural network substructures, the matrix describing the changes in the loss function due to simultaneous pruning of at least two network substructures from the plurality of neural network substructures which are situated within different layers of the two or more layers of the predefined neural network, wherein the computation of the matrix includes multiplying of gradients with a plurality of pruning vectors to ascertain a plurality of second vectors, the gradients being given by the present weights of the predefined neural network, each pruning vector from the plurality of pruning vectors being assigned to a respective network substructure of the at least two network substructures to be pruned, each pruning vector from the plurality of pruning vectors describing a change in the present weights due to the pruning of the respective neural network substructure, each second vector being assigned the respective pruning vector by the multiplication, and wherein components of the matrix are determined as a function of the second vectors; and pruning, based on the changes in the loss function described in the matrix, at least one neural network substructure from the plurality of neural network substructures, to generate the simplified neural network.

2. The method as recited in claim 1, wherein the predefined neural network is a trained neural network, a training data set for training the neural network describing a behavior of the device, the training data set being made up of a plurality of pairs, each pair being formed of input sets and respective output sets of the device, and the predefined neural network generating the respective output sets for the input sets of each pair.

3. The method as recited in claim 2, wherein the computation of the matrix is carried out by computing a scalar product of the second vectors from the plurality of second vectors for a plurality of pairs of neural network substructures from the plurality of neural network substructures of the trained neural network.

4. The method as recited in claim 1, wherein the predefined neural network is an incompletely trained neural network, in that a vector of first derivatives of the loss function with respect to their weights, which is calculated after a use of the present weights, takes on a value which does not correspond to a local minimum of the loss function for the present weights.

5. The method as recited in claim 4, wherein the computation of the matrix includes the following steps:
computing a first contribution by computing a scalar product of the second vectors from the plurality of second vectors for a plurality of pairs of neural network substructures from the plurality of neural network substructures;
computing a second contribution to primary diagonal components of the matrix by computing a scalar product of a vector of the first derivatives of the loss function with respect to the plurality of pruning vectors, in which subsequently the present weights are used, and the plurality of pruning vectors; and
adding the first contribution to the second contribution.

6. The method as recited in claim 3, wherein the pruning includes:
adding across all components in each column of the matrix to obtain a plurality of sums; and
iteratively removing a plurality of the neural network substructures, proceeding from a first neural network substructure which corresponds to a smallest amount of a sum of the plurality of sums.

7. The method as recited in claim 3, wherein the pruning includes:
removing a first neural network substructure which corresponds to a smallest amount of a primary diagonal component of the matrix; and
iteratively removing a plurality of the neural network substructures, each of the subsequent neural network substructures to be removed corresponding to a smallest amount of a sum of a plurality of sums of a primary diagonal component and non-diagonal components of the matrix, which relate to previously removed neural network substructures.

8. The method as recited in claim 3, wherein the pruning includes:
removing a first neural network substructure, which corresponds to a primary diagonal component of the matrix having a predefined value;
iteratively removing a plurality of the neural network substructures, each subsequent neural network substructure to be removed corresponding to a next-larger value of the primary diagonal components of the matrix.

9. The method as recited in claim 8, wherein the predefined value is a smallest primary diagonal component of the matrix.

10. The method as recited in claim 6, wherein the iterative removal is carried out until a size of the simplified neural network drops below a desired size.

11. The method as recited in claim 6, wherein the iterative removal is carried out until an overall performance of the simplified neural network drops below a predefined threshold value.

12. The method as recited in claim 1, wherein the changes in the loss function, using a Taylor series of the second order of the predefined neural network, are approximated by its present weights.

13. The method as recited in claim 12, wherein the Taylor series also includes terms of a first order.

14. The method as recited in claim 1, wherein the neural network is an image classifier, the image classifier being configured to receive input data in the form of image data and to classify the image data into one or multiple class(es).

15. The method as recited in claim 14, wherein the image classifier is configured to classify the image data based on a semantic segmentation of the image data.

16. The method as recited in claim 1, further comprising:
controlling the device by the simplified neural network; or
identifying an operating state of the device or a state of the surroundings of the device by the simplified neural network; or
assessing an operating state or a state of the surroundings of the device by the simplified neural network.

17. A non-transitory machine-readable memory medium on which is stored a computer program for generating a simplified computer-implemented neural network for a device, the computer program, when executed by a computer, causing the computer to perform the following steps:
receiving a predefined neural network, which includes a plurality of neural network substructures in two or more layers;
computing an approximative neural network for the predefined neural network, wherein the computation of the approximative neural network includes a linearization around present weights of the predefined neural network;
computing a matrix with respect to the approximative neural network, which describes changes in a loss function by a pruning of one or multiple neural network substructure(s) from the plurality of neural network substructures, the matrix describing the changes in the loss function due to simultaneous pruning of at least two network substructures from the plurality of neural network substructures which are situated within different layers of the two or more layers of the predefined neural network, wherein the computation of the matrix includes multiplying of gradients with a plurality of pruning vectors to ascertain a plurality of second vectors, the gradients being given by the present weights of the predefined neural network, each pruning vector from the plurality of pruning vectors being assigned to a respective network substructure of the at least two network substructures to be pruned, each pruning vector from the plurality of pruning vectors describing a change in the present weights due to the pruning of the respective neural network substructure, each second vector being assigned the respective pruning vector by the multiplication, and wherein components of the matrix are determined as a function of the second vectors; and pruning, based on the changes in the loss function described in the matrix, at least one neural network substructure from the plurality of neural network substructures, to generate the simplified neural network.

18. The method as recited in claim 1, further comprising:

controlling the device, using the simplified neural network, wherein the device is an at least semi-autonomous robot.

\* \* \* \* \*